F. A. FELDKAMP.
RADIATOR SECTION.
APPLICATION FILED OCT. 28, 1909.
999,441.
Patented Aug. 1, 1911.
2 SHEETS—SHEET 2.
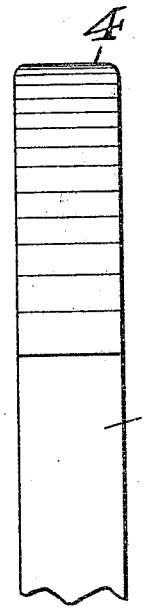
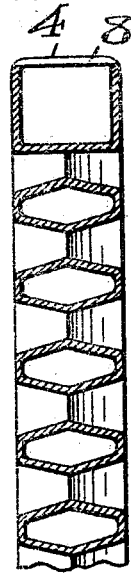
Fig. 3
Fig. 4
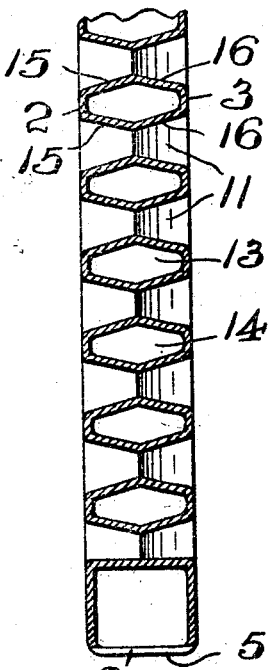
Fig. 2
WITNESSES:
Fredk H. W. Fraentzel
Anna H. Alter.
INVENTOR:
Frederick A. Feldkamp,
BY
Fraentzel and Richards,
ATTORNEYS

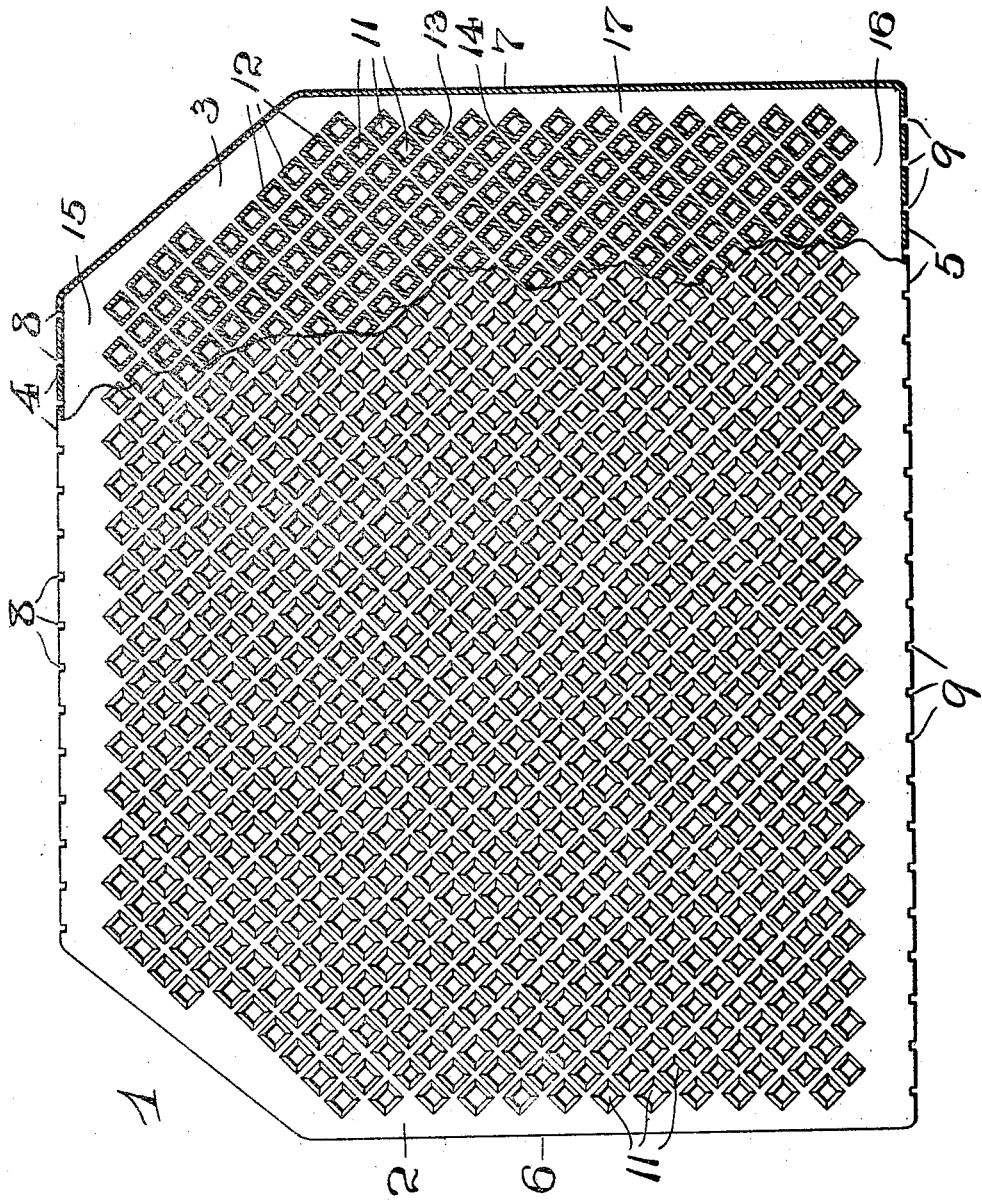

UNITED STATES PATENT OFFICE.

FREDERICK A. FELDKAMP, OF UNION, NEW JERSEY, ASSIGNOR TO ELECTROLYTIC PRODUCTS COMPANY, A CORPORATION OF NEW JERSEY.

RADIATOR-SECTION.

999,441.  Specification of Letters Patent.  Patented Aug. 1, 1911.

Application filed October 28, 1909. Serial No. 525,211.

*To all whom it may concern:*

Be it known that I, FREDERICK A. FELDKAMP, a citizen of the United States, residing at Union, in the county of Union and State of New Jersey, have invented certain new and useful Improvements in Radiator-Sections; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

My present invention has reference, generally, to improvements in radiator-sections of that class which are used in the construction of radiators for automobiles, motor-cars, and vehicles of a similar nature; and, the present invention has for its principal object to provide a novel and simple radiator-section, all of the parts of which comprise an electrolytically deposited structure in which all of the said parts are made in one integral piece, consisting of a multiplicity of hollow or tubular portions, interspersed with a multiplicity of small holes or openings for the circulation of air or other cooling medium between the outer surfaces of the said hollow or tubular portions, and all of the parts being so closely located with relation to each other, that it is impossible to produce the radiator-section by the usual process of casting.

The invention has for its further object to provide a hollow honey-comb one-piece radiator-section made by electro-deposition, in which all of the wall-portions of the section are of a uniform thickness of the electrically deposited metal.

Other objects of this invention not at this time more particularly enumerated will be clearly understood from the following detailed description of my present invention.

With the various objects of my present invention in view, the said invention consists, primarily, in the novel and electrolytically produced radiator-section hereinafter set forth; and, the invention consists, furthermore, in such novel arrangements and combinations of the parts thereof, all of which will be more fully described in the following specification and then finally embodied in the clauses of the claim which are appended to and which form an essential part of the said specification.

The invention is illustrated in the accompanying drawings, in which:—

Figure 1 is a view of a radiator-section representing one embodiment of my present invention, said view showing the radiator-section partly in elevation and partly in longitudinal vertical section. Fig. 2 is an end-view of portions of the said radiator-section, and Fig. 3 is a transverse vertical section of the same, said Figs. 2 and 3 showing the parts made on an enlarged scale. Fig. 4 is a detail edge-view of the upper or the lower edge-portion of a radiator-section of a slightly modified form, but still embodying the features of my present invention.

Similar characters of reference are employed in all of the above described views, to indicate corresponding parts.

Referring now to the several figures of the drawings, the reference-character 1 indicates the complete radiator-section, all of the parts of which are made in one integral piece, substantially as shown, the said section consisting mainly of a hollow shell formed by the front face 2, the rear face 3, the top 4, the base 5, and the ends 6 and 7. The top 4 is made with slits 8, and the base 5 is made with slits 9, as shown in said Figs. 1 and 3 of the drawings. In lieu of said openings or slits 8 and 9, the said parts may be formed with circular openings 10, as illustrated in Fig. 4 of the drawings, or openings of any other suitable configuration may be employed, if desired. The front and rear faces of the said hollow shell are also provided with a multiplicity of oppositely disposed openings 11 of any desired configuration. Within the space, between the inner face of the front 2 and the rear 3, and surrounding each opening 11 are thin walls 12, said walls being arranged in such close proximity to each other, so that in addition to forming with said holes 11, suitable ventilating ducts or passageways, the said walls will also form tubular or hollow portions, as 13 and 14, which are preferably made to extend diagonally in opposite directions, so as to cross each other, in substantially the manner illustrated in Fig. 1 of the drawings. In addition to these tubular or hollow portions 13 and 14, which form a multiplicity of water-conveying ducts, as will be clearly evident, the hollow shell of the radiator-section provides the marginal water-spaces 15 and 16, respectively at the top and bottom of the section, and the marginal water-spaces 17 at the sides thereof, and with which the tubular portions 13 and 14 communicate, as clearly shown. The slits or openings in the top of the radiator-section, it will be clearly evident, will provide water-inlets for admitting hot or warm water into the interior of the radiator-section, and into and through the ducts formed by the hollow portions 13 and 14, while the slits or openings in the bottom of the radiator-section provide suitable outlets for the cooled water from the said radiator-section, as will be clearly evident.

As shown more particularly in Fig. 2 of the drawings, the thin connecting walls 12 between the inner faces of the front face 2 and the rear-face 3, are angularly arranged, as at 15 and 16, substantially as shown in said Fig. 3, whereby the tapering openings which are of larger cross-section at the front and rear faces of the said radiator-section, than at the points midway between said front and rear-faces, so that increased radiating and cooling surfaces are provided.

As has been stated, to produce radiator-sections of the general character and construction hereinbefore set forth, it is necessary that the complete structure is made in one integral piece, the metal being electrolytically deposited copper or other electrolytically deposited metal. One method or manner of producing such electrolytically deposited structure is described in my former application for Letters-Patent, filed April 10th, 1909, Serial Number 489,178, and the particular processes under which the hollow one-piece honey-comb electrolytically deposited radiator-sections, as herein claimed, can be made, are set forth in my other applications for Letters-Patent, Serial No. 258,110, filed Sept. 15, 1910, and Serial No. 595,831, filed Dec. 5, 1910, and briefly is as follows:—Into a suitable mold of steel, iron, or other suitable material, I pour an easily fusible metal or alloy, the melting point of which is below the boiling point of water, so as to produce a solid metal core, formed with a multiplicity of holes or openings, conforming to the general shape and configuration of the radiator-section desired. After removing the metal pattern, which has thus been produced, from the mold, the same is suspended, as a cathode, in an electroplating bath of the proper density and temperature.

The electrolytic deposition of copper or other suitable metal, briefly, is as follows:—Before immersing the fusible alloy-core or pattern in the electro-plating bath, an insulating material which is provided with holes or openings corresponding to the holes of openings in the said core or pattern, is arranged upon the outer surface-portions of the said core or pattern. This covered or inclosed core or pattern is then immersed in the electro-plating bath, and an electro-deposition or plating of metal is first made within the said holes or openings in the core or pattern, without the use of anode-rods being arranged in said small holes or openings, the plating being continued toward the marginal edge-portions of said holes or openings. The said core or pattern, with said first electro-deposition or plating of metal, is then taken from the electro-plating bath, and the insulating jacket is removed. The core or pattern, with said first electro-deposition or plating of metal, is now again immersed in the electro-plating bath, and subjected to the action of the electrolyte. Another electrolytic deposit or plating of metal is now made upon the outer exposed surface-portions of the core or pattern, and inwardly into the holes or openings in said core or pattern, a further deposit of metal being made upon the previous electrolytic deposit or plating of metal within said holes or openings. A uniform thickness throughout of all the electrolytically deposited metal is thus produced without the use of anode-rods arranged in the individual holes or openings of the core or pattern. It will be evident, however, that the various steps of this process may be reversed, the electroplating of metal being first made upon the outer surface-portions of the core or pattern and inwardly into the holes or openings in said core or pattern, then placing the insulating material over the outer electro-plated surface-portions of the core or pattern, and subjecting the same once more to the plating action, making a second electrolytic deposit or plating of metal directly into the previously electro-deposited holes or openings, continuing the plating from within the central portions of said partially plated holes or openings in outward directions toward the marginal edge-portions of said holes or openings.

The plated pattern or section is removed from the electro-plating bath and thoroughly cleansed by washing. The previously mentioned inlet and outlet openings are now formed in the said electrodeposited skin or envelop, either by means of saw-cuts, by drilling, or otherwise. The interior alloy-core is then removed by the melting-out process, by placing the electroplated alloy-pattern in boiling water or steam, in a suitably heated vessel, taking care that the said electro-plated alloy-pattern is held in the water in such a manner, that the melting metal-alloy will be entirely removed, with the result that a complete and hollow or chambered radiator-section or element of the general construction shown in the accompanying drawings, is produced.

In this manner I have been enabled to produce a radiator-section in which all of the parts are made in one integral piece, and throughout of uniform thickness, thereby avoiding the great cost of assembling a great many small parts and securing them together by means of solder or other means of fastening. I am also enabled to produce a hollow or chambered radiator-section, having the interior thereof studded with a great many hollow or tubular members which are very closely placed together, said members extending from one side of the radiator-section to the other side thereof, so that the interior of the section is formed with a multiplicity of closely located hot-water conveying ducts, and with air-conveying openings leading from one side to the other side of the said radiator-section.

I claim:—

1. As a new article of manufacture, a hollow one-piece honey-comb electrolytically deposited radiator-section provided with a multiplicity of minute holes forming air-passages, and interiorly arranged hollow elements integrally united with the inner faces of the sides of said radiator-section, arranged to provide a multiplicity of interior water-conveying ducts, the walls of said ducts and the outer walls of the radiator-sections being all of uniform thickness, said uniform thicknesses of the electro-deposited metal being produced by plating from an exteriorly placed anode upon a fusible core or pattern, formed with holes or openings, upon the outer surface portions of the said core or pattern and by means of the same exteriorly placed anode plating upon the inner surface-portions of the holes or openings in said core or pattern.

2. As a new article of manufacture, a hollow one-piece honey-comb electrolytically deposited radiator-section provided with a multiplicity of minute holes forming air-passages, and interiorly arranged hollow elements integrally united with the inner faces of the sides of said radiator-section, arranged to provide a multiplicity of interior water-conveying ducts, the walls of said ducts and the outer walls of the radiator-section being all of uniform thickness, said uniform thicknesses of the electro-deposited metal being produced by plating from an exteriorly placed anode upon a fusible core or pattern, formed with holes or openings, upon the outer surface-portions of the said core or pattern and by means of the same exteriorly placed anode producing two successive electrolytic depositions of metal within holes or openings in said core or pattern.

3. As a new article of manufacture, a hollow one-piece honey-comb electrolytically deposited radiator-section provided with a multiplicity of minute holes forming air-passages, and interiorly arranged hollow elements integrally united with the inner faces of the sides of said radiator-section, arranged to provide a multiplicity of interior water-conveying ducts, the walls of said ducts and the outer walls of the radiator-section being all of uniform thickness, said uniform thicknesses of the electro-deposited metal being produced by two independent plating steps, one step being produced by plating the interior surface-portions of a series of holes in a fusible core, the exterior surface-portions of the core being insulated from the action of the electrolyte, and the other step being produced by plating upon the exposed surface-portions of the core, after removal of the insulating element, and the continuance of the electroplating step into the interior of the said holes.

4. As a new article of manufacture, a hollow one-piece honey-comb radiator-section provided with a multiplicity of minute holes or air passages, the walls of which are of uniform thickness throughout the entire body of said radiator-section, said uniform thickness being produced by electrolytically depositing metal upon a core or pattern, first by directing the depositing current from an exterior anode to produce a deposition within a multiplicity of holes in the core or pattern, and secondly, by directing the depositing current from said exterior anode to produce a deposition upon the whole surface of said core or pattern, and upon the electrolytic deposition of metal within the holes in said core or pattern.

In testimony, that I claim the invention set forth above I have hereunto set my hand this 20th day of October, 1909.

FREDERICK A. FELDKAMP.

Witnesses:
 FREDK. C. FRAENTZEL,
 FREDK. H. W. FRAENTZEL.